United States Patent [19]

Hedgewick

[11] Patent Number: 5,502,593
[45] Date of Patent: Mar. 26, 1996

[54] COMPACT PAVEMENT MARKER

[75] Inventor: Peter Hedgewick, Windsor, Canada

[73] Assignee: Pac-Tec, Inc., Newark, Ohio

[21] Appl. No.: 924,679

[22] Filed: Aug. 3, 1992

[51] Int. Cl.⁶ ................................................. G02B 5/136
[52] U.S. Cl. .......................... 359/547; 359/536; 359/551; 404/14
[58] Field of Search ............................ 359/530–532, 359/534–536, 547, 551, 552; 404/14, 16

[56] References Cited

U.S. PATENT DOCUMENTS

| D. 244,764 | 6/1977 | Grubauer | D10/113 |
|---|---|---|---|
| 3,693,511 | 9/1972 | Medynski | 359/551 |
| 3,836,226 | 9/1974 | Cedhetini | 359/547 |
| 3,954,324 | 5/1976 | Arnott et al. | 359/529 |
| 3,971,623 | 7/1976 | Hedgewick et al. | 359/531 |
| 4,237,191 | 12/1980 | Horne | 359/551 |
| 4,875,798 | 10/1989 | May | 359/531 |
| 5,002,424 | 3/1991 | Hedgewick | 359/547 |
| 5,006,010 | 4/1991 | Duckett | 404/12 |

*Primary Examiner*—James Phan
*Attorney, Agent, or Firm*—Gifford, Krass, Groh, Sprinkle, Patmore, Anderson & Citkowski

[57] ABSTRACT

A low profile pavement marker having a glass bead type reflector and an inclined top surface is disclosed. Flanges extend from a peripheral surface on the face and from the rear of the reflector for engagement with epoxy for mounting the pavement marker to the road surface. The front face is angled to permit wiping of the glass beads of the reflector. The shell of the pavement marker may be trimmed to be combined with other shells or other reflectors.

14 Claims, 2 Drawing Sheets

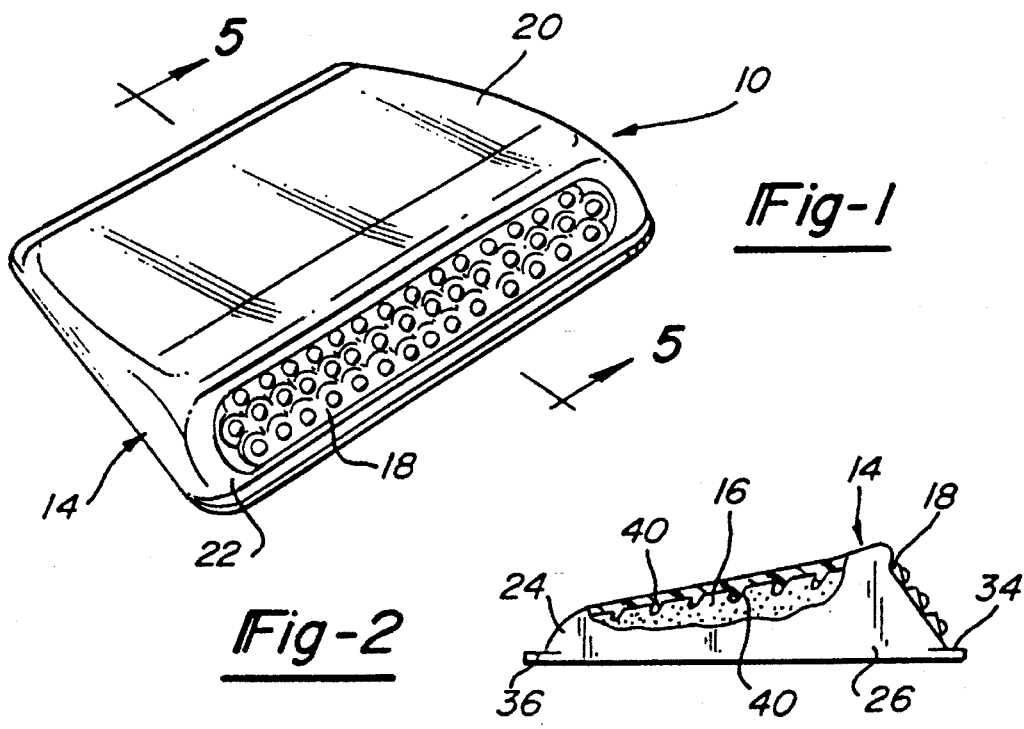
Fig-1
Fig-2
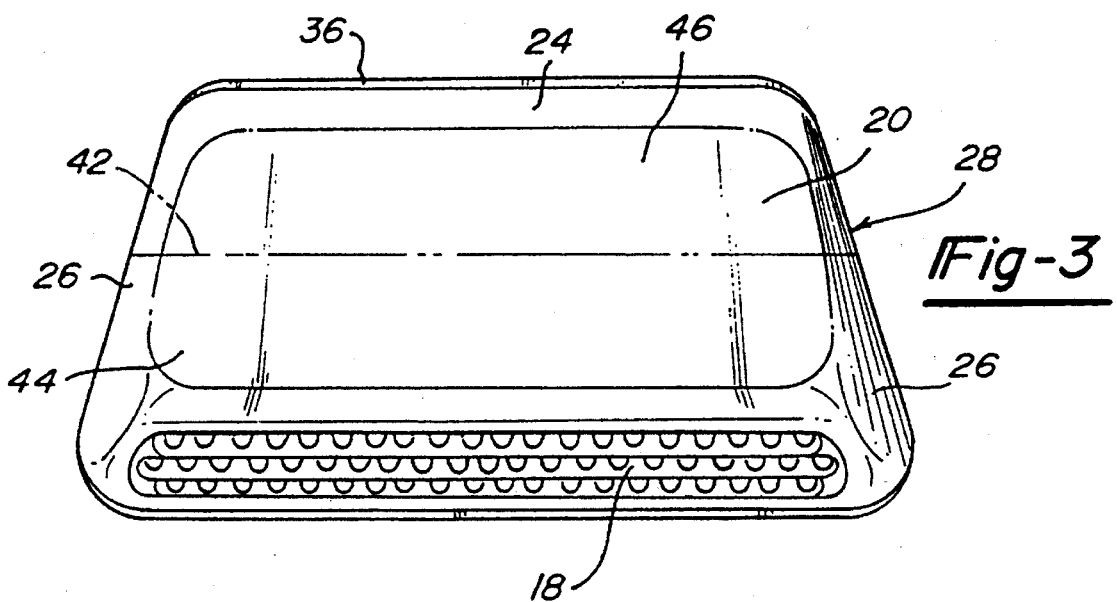
Fig-3
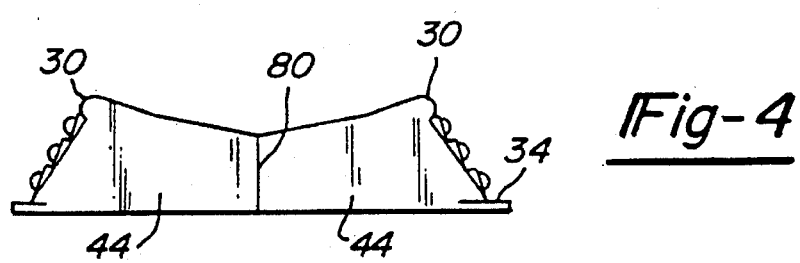
Fig-4

COMPACT PAVEMENT MARKER

BACKGROUND OF THE INVENTION

I. Field of the Invention

The invention relates to a pavement marker having a retro-reflector and a method of manufacturing the pavement marker and, more particularly, to a low profile pavement marker adapted to be mounted on the roadway surface to reflect light from headlights of an oncoming automobile to delineate traffic lanes of the road.

II. Description of the Prior Art

Reflective roadway markers are used by highway departments and others for delineating highway lanes. Properly designed reflective markers are clearly visible at night by reflecting light from an oncoming vehicle back to the vehicle. Such markers generally include a body and at least one reflective lens supported by the body.

Cube corner type plastic lens such as disclosed by Balint, et al, U.S. Pat. No. 3,409,344 are frequently used in pavement markers. Balint discloses a roadway marker including a housing molded in situ about a plurality of reflective inserts, the inserts having a substantially flat outer surface and a plurality of retro-reflective prisms on their inner surfaces. The inner surface of the prisms are coated with a metalized layer. The entire housing is filled with plastic material in order to provide strength and rigidity to the marker.

It is also known to incline the flat surface of the lens at a predetermined angle with respect to the roadway surface so that the self-cleaning of the lens is provided by the passing of a tire over the lens. The angle that the reflective lens makes in relation to the pavement surface effects the relative efficiency of both the cleaning and the efficiency of the retro-reflective prism surfaces. It is generally desired to select an angle so that the reflective efficiency of the prism surface is maximized. However, cube corner lenses are typically made of an acrylic plastic which is brittle and frequently is cracked or broken. Likewise, these markers are frequently dislodged from the roadway surface.

Because the handling of an automobile is effected by the passing of its tire over the pavement marker, it is desirable to have as low a profile marker as possible to avoid distorting the handling characteristics of the automobile. However, since the lens of the pavement marker must reflect a predetermined amount of light, such as three candle power, as required by the highway departments, it is necessary to produce a lens with sufficient reflectors to reflect this amount of light.

Thus, it is desirable to provide a reflector which has a low profile and sufficient retro-reflectivity. Likewise, it is an object of this invention to provide a pavement marker which is strong and adheres well to the road.

SUMMARY OF THE INVENTION

The present invention overcomes these and other problems by providing a low profile pavement marker with a glass bead type reflector. The pavement marker includes a shell having a front face containing a glass bead type reflector and a rounded rear end. The glass bead reflector is angled in a range from between 35° to 55° to the road surface to promote wiping of the glass beads of the reflector by tires of traffic passing over the reflector.

The top surface of the shell is inclined gradually downwardly from the front face to rear end to reduce the dislodgement force of the tire on the shell. Additionally, projections extend from the front and rear ends at a bottom edge of the shell to be embedded in epoxy or similar material for securely mounting the pavement marker on the road surface. Also disclosed is a method of forming the pavement marker utilizing base projections to support the shell while being filled with potting material.

BRIEF DESCRIPTION OF THE DRAWING

FIG. 1 is a perspective view of a "cats eye" reflector according to the invention;

FIG. 2 is a sectional view of the pavement marker taken in the direction of arrows 2—2 of FIG. 1;

FIG. 3 is a top view of the pavement marker;

FIG. 4 is an alternative embodiment of the pavement marker having two reflective surfaces;

DETAILED DESCRIPTION OF THE DRAWINGS

Figure 8:
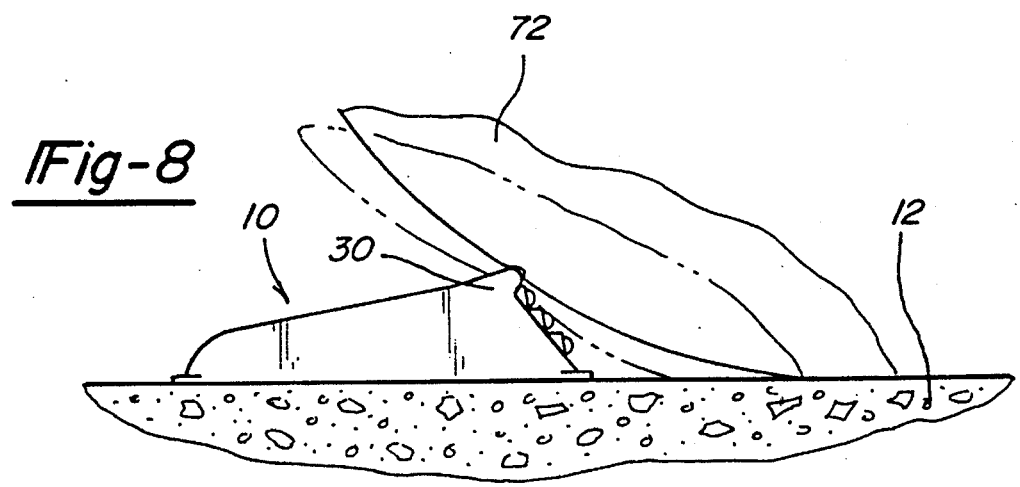
FIG. 8 is a side view of the pavement marker shown in use with a tire passing over the marker.

Referring now to the drawings and, more particularly, to FIG. 1, thereshown is a pavement marker 10. As shown in FIG. 8, the pavement marker may be mounted to a roadway surface 12.

As shown in FIG. 2, the pavement marker 10 includes a shell filled with a potting material 16 and supporting a reflector 18. The shell 14 includes an inclined top surface 20, a front face 22, a rear end 24 and a pair of sides 26.

The top surface is generally flat and slopes downwardly from the front face 22 to the rear end 24. The rear end 24 and the pair of sides 26 are contoured downwardly from the top surface 20 to a bottom edge 28.

As shown in FIGS. 1 and 3, the pair of sides 26 and rear end 24 are rounded or curved downwardly from the top surface to the bottom edge 28 to reduce deflection of a tire of an automobile as it passes over the pavement marker. The top surface 20 is sloped downwardly to reduce forces on the pavement marker when the tire of an automobile which tend to dislodge the road marker from the roadway or compress the marker into roadway surfaces such as asphalt which softens with warm temperatures.

The pair of sides converge 26 inwardly from the front face 22 to the rear end 24, resulting in a minimalized profile for reducing the distortion in the tire occurring when the tire of a vehicle passes over the pavement marker.

Figure 5:
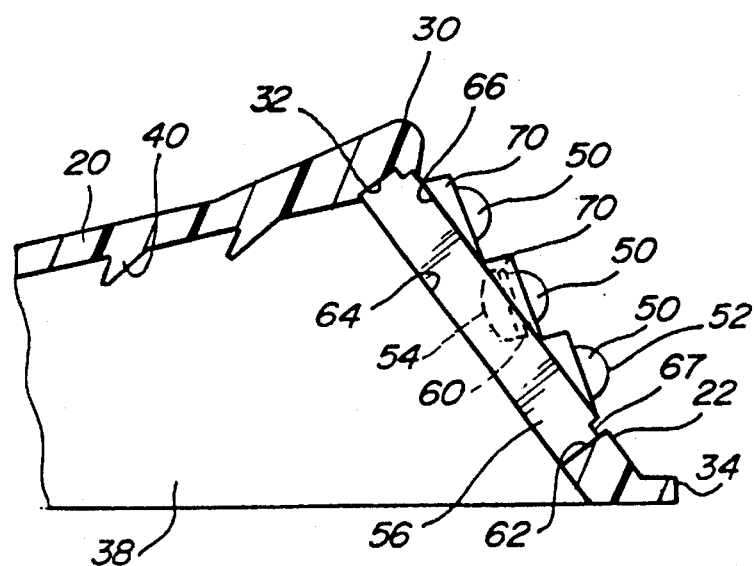
FIG. 5 is a partial cut away view of the shell and reflector of the pavement marker in accordance with the invention.

As best shown in FIG. 5, a brow 30 extends along a top edge of the front face 22. The brow 30 extends slightly upwardly from the top surface 20 and outwardly from the front face 22 to deflect the tire from an upper edge 32 of the reflector 18 The reflector 18 is mounted within the front face 22. In the preferred embodiment, the reflector 18 is encased or molded within the shell, however, the shell may be formed with an aperture for receiving and holding the reflector.

As shown in FIG. 2, a flange 34 extends outwardly from the front face and another flange 36 extends from the rear end of the marker. The flanges 34, 36 extend outwardly at the peripheral edge 28 to improve the holding of the marker 10 to the road surface 12. Because the marker is glued to the road surface with epoxy, or similar material, excess epoxy flows over the flanges 34, 36 to encase the flange and engage the road marker when the epoxy cures. While the flanges are shown as continuous, alternative structures, such as intermittent flanges, may be used anywhere along the bottom edge of the marker.

As shown in FIGS. 2 and 5, the shell has an interior surface 38 extends to define a cavity within the shell for accepting the potting material 16. The potting material may be an epoxy resin such as disclosed, for example, in U.S. Pat. No. 3,409,334 to Balint, and Suhr, U.S. Pat. No. 3,984,175. The potting material 16 is a filler which provides impact strength to the shell. In order to keep the filler from separating from the inner surface of the shell, a plurality of projections 40 are formed on the interior surface 38 to engage and interlock with the potting material. The projections 40 are angled and may be formed as a shallow thin ribbing extending outwardly and at an angle from the interior surface 38 of the shell. A coating of sand as is known in the art may be applied to the surface of the potting material in order to improve the holding power of the epoxy or other material which is used to secure the marker to the road.

As shown in FIG. 3, a cutting line 42 extends across the pair of sides 26 and top surface 20 parallel to the front face 22. The cutting line 42 defines a front section 44 and rear section 46 of the marker. As discussed more fully below, the cutting line is positioned on the shell to act as a guide for separating the front section 44 from the rear section 46 in a convenient manner, such as by sawing. The front section 44 then may be combined with other components, such as another front section 44, to form a pavement marker having two multiple reflecting surfaces, such as shown in FIG. 4. The cutting line is located a convenient distance, such as 1¼", from the peripheral edge of the front face.

The pavement marker has a height of 0.6" from the brow to the peripheral edge and tapers to a height of 0.2" at the rear end. The marker is approximately 4¾" wide between the sides along the front face of the marker. The marker has an additional length of approximately 1" from the cutting line to the rear end. The taper of the top surface is approximately 22°. The brow extends outwardly from the front face approximately 0.020 inches.

As set forth below, the shell is intended to be formed in a unitary molding process of a suitable durable moldable material, such as polycarbonate.

As best shown in FIG. 5, the reflector 18 is of the glass bead type reflector which is known in the art. A plurality of glass beads 50 having a spherical outer surface 52 and a parabolic inner surface 54 are partially encased in a molded body 56 of material such as ABS or plastic. The parabolic surface 54 of the glass beads are coated with metalized or mirror coating 58 for reflecting light entering the bead through the spherical outer surface 52. A flat annular surface 60 extends from the spherical outer surface.

The body 56 has a bottom edge 62 spaced apart from the top edge 32, a bottom surface 64, top surface 66, extending between a pair of ends 65. A peripheral lip 67 extends around the top surface to receive the shell. Three rows of glass beads 50 are aligned in rows with a staggered pattern of beads. The top surface 66 of the body 56 is aligned so that a plane extending through the top surface 66 is parallel to a plane extending through the front face of the shell. However, because the axis of the glass beads must be aligned generally with the direction of the incoming light from approaching vehicles, the axis of the glass beads are frequently angled with respect to the plane of the top surface of the body.

As shown in FIG. 5, the glass beads are held in proper alignment within the body in a partial cylindrical projection 70. The projection 70 is formed over the parabolic surface of the glass bead 50 and the annular surface 60 to hold the beads in proper alignment to reflect light from the oncoming traffic. Previously known pavement markers using glass bead type reflectors generally maintain the angle of the front face and top surface of the substrate at a relatively shallow angle with respect to vertical, such as 15° to 20°. Because dirt and grime on the glass beads 50 will reduce the amount of reflected light, it is desirable to keep the glass beads clean. Passage of automobile tires over such reflectors results in contact between the tire and at least the top row of glass beads to wipe and thereby clean the glass beads. However, it has been found that increasing the angle between the front face and top surface of the reflector to an angle greater than 32° from vertical or between 35° to 58° from the road surface increases the wiping effect of a tire 73 so that all three rows of glass beads are wiped by a passing tire 72 as shown in FIG. 8.

Method of Manufacture and Use

The shell 14 is formed or molded over the reflector 18 to provide a strong long, lasting pavement marker. The mold (not shown) is formed such that the reflector 18 is held in place and moldable material, such as a polycarbonate, is injected into the mold about the reflector to engage the top, bottom and side edges of the reflector.

Figure 6:
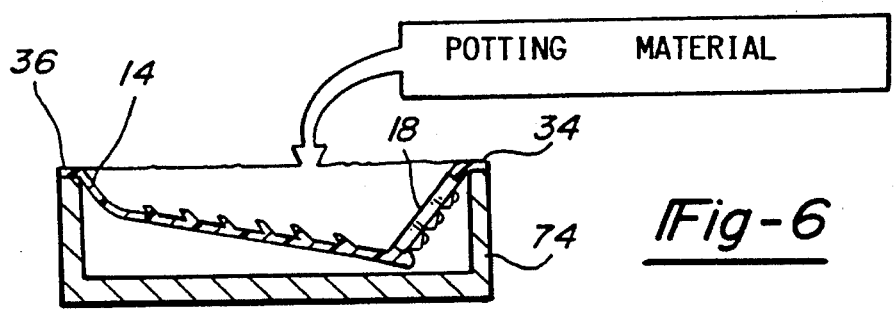
FIG. 6 is a cut away view of the pavement marker as it is being manufactured and claimed with the method of the invention.

The mold is formed so that the entire shell is formed in one unitary molding operation. After the shell is molded as is known in the art, the shell and reflector is ejected as a single unit from the mold and the position on stand 74 in an inverted manner as shown in FIG. 6, the shell is supported by the flanges 34, 36 on the stand 74 with the bottom edge of the shell in a horizontal plane, such that the potting material 16 may be poured into the cavity. After the potting material 16 is poured into the shell, the pavement marker maybe moved on the stand by a conveyor belt (not shown) while the potting material cures.

As best shown in FIG. 4, an alternative embodiment of the invention includes joining a pair of front sections 44 of the shell together so that the front faces oppose each other. As set forth above, the shell can be trimmed at the cutting guide 42 to form a back edge 80. Two front sections may be joined together at the back edges 80 in a suitable manner, such as by gluing or epoxying, to form a double reflector pavement marker.

Figure 7:
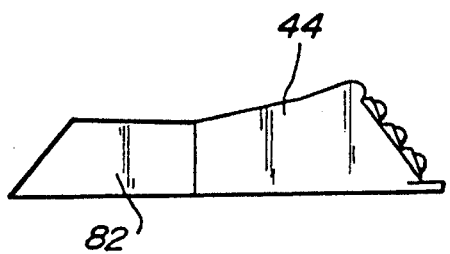
FIG. 7 is an alternative embodiment of the pavement marker according to the invention.

As shown in FIG. 7, in some cases it may be necessary to form a pavement marker having a primary reflector for reflecting light from an oncoming car and a secondary reflector of a color such as red or blue for indicating the back of the pavement marker. Because the reflectivity requirement of the colored marker is generally less than of the primary marker, a small conventional marker 82 may be joined to a front section 44 of a pavement marker which has been cut along the guide line as discussed above. The height and width of the shell at the guideline may be dimensioned so that the rear end of the shell is of the proper dimensions to mate with conventional colored reflector Color reflectors for use in this manner are known as Ray, Jr., and manufactured by Pac-Tec, Inc., of Ohio.

The invention having been described, however, many modifications thereto will become apparent to those skilled in the art to which it pertains without deviation from the spirit of the present invention as defined by the scope of the appended claims.

What is claimed is:

1. A pavement marker for reflecting light from the headlight of a vehicle, said pavement marker being adapted for mounting to a road surface, said pavement marker comprising:

a shell having a front face, a rear portion, and a generally planar top surface extending between said front face and said rear portion, said front face having a predetermined height which is greater than a predetermined height of said rear portion, said top surface extending above said road surface along a first plane which slopes downwardly between said front face and said rear portion; and means for reflecting light mounted to said front face of said shell.

2. The pavement marker of claim 1, wherein said means for reflecting comprises a reflector having a plurality of glass beads mounted in a body.

3. The pavement marker of claim 2, wherein said shell defines a cavity containing a potting material.

4. The pavement marker of claim 3, wherein said shell has an inner surface defining said cavity and a plurality of projections extending from said inner surface into said cavity for engaging said potting material.

5. The pavement marker of claim 1, wherein said pavement marker further comprises said front face extending along a second plane which intersects said road surface at an angle having a range between 35°–58°.

6. The pavement marker of claim 1 further having a brow extending from along a top edge of said pavement marker.

7. The pavement marker of claim 6, wherein said brow extends to engage a portion of said means for reflecting light.

8. The pavement marker of claim 1, wherein said shell being formed of a moldable polycarbonate material.

9. The pavement marker of claim 1, further comprising a pair of sides converging inwardly toward each other as said pair of sides extend from said front face to a rear end of said shell.

10. A method of forming a pavement marker comprising the steps of:

forming a shell about a reflector, said shell having an internal cavity, said cavity having an opening at a bottom portion of said shell;

forming a pair of projections on a shell extending on a horizontal plane, each projection extending from opposites of said shell;

supporting said shell on said projections in an inverted position with said opening of said cavity above said reflector; and filling said cavity with a potting material.

11. A method of forming a pavement marker comprising the steps of:

forming a first shell and a second shell, each of said first and second shells having a front portion having a reflective portion and a rear portion;

separating said front portion from said rear portion to form a back edge on said front portion;

gluing said back edge of said front portion of said first shell to said back edge of said front portion of said second shell.

12. A pavement marker for reflecting light from the headlight of a vehicle, said pavement marker being adapted for mounting to a road surface, said pavement marker comprising:

a shell having a front face, a rear portion, and a top surface extending between said front face and said rear portion along a first plane which is angled with respect to said road surface, said shell defining a cavity containing a potting material, said shell having an inner surface defining said cavity and a plurality of projections extending from said inner surface into said cavity for engaging said potting material, said shell further having a top edge having a brow extending therefrom; and means for reflecting light mounted to said face of said shell.

13. The pavement marker of claim 12, wherein said brow extends to engage a portion of said means for reflecting light.

14. A pavement marker for reflecting light from the headlight of a vehicle, said pavement marker being adapted for mounting to a road surface, said pavement marker comprising;

a shell having a pair of front portions joined together at respective rear edges, each front portion further having a front face and a generally planar top surface extending between said front face and said rear edge along a first plane which is angled downwardly from said front face to said rear edge; and means for reflecting light mounted to said front faces of said shell.

* * * * *